(12) United States Patent  (10) Patent No.: US 8,975,330 B2
Lin  (45) Date of Patent: Mar. 10, 2015

(54) COATING COMPOSITION

(75) Inventor: Shiow-Ching Lin, Lawrenceville, NJ (US)

(73) Assignee: Solvay Specialty Polymers Italy S.p.A., Bollate (MI) (IT)

( * ) Notice: Subject to any disclaimer, the term of this patent is extended or adjusted under 35 U.S.C. 154(b) by 143 days.

(21) Appl. No.: 13/501,238

(22) PCT Filed: Oct. 14, 2010

(86) PCT No.: PCT/EP2010/065424
§ 371 (c)(1),
(2), (4) Date: Apr. 11, 2012

(87) PCT Pub. No.: WO2011/045375
PCT Pub. Date: Apr. 21, 2011

(65) Prior Publication Data
US 2012/0202935 A1 Aug. 9, 2012

Related U.S. Application Data

(60) Provisional application No. 61/252,009, filed on Oct. 15, 2009.

(51) Int. Cl.
C09D 127/16 (2006.01)
C08K 5/07 (2006.01)
B32B 1/08 (2006.01)
B32B 27/30 (2006.01)
C09D 133/24 (2006.01)
C08L 33/24 (2006.01)

(52) U.S. Cl.
CPC ............ C09D 127/16 (2013.01); C09D 133/24 (2013.01); C08L 33/24 (2013.01)
USPC .......................... 524/523; 524/365; 428/36.91

(58) Field of Classification Search
CPC .......... B32B 1/08; B32B 27/08; B32B 27/30; F16L 9/14; C08L 77/00; C09D 127/16; C08K 5/07
USPC ................. 428/36.91; 524/520, 365
See application file for complete search history.

(56) References Cited

U.S. PATENT DOCUMENTS

| 2,146,209 A | 2/1939 | Graves |
| 4,246,374 A | 1/1981 | Kopchik |
| 5,284,913 A | 2/1994 | Sasaki et al. |
| 5,510,160 A | 4/1996 | Jadamus et al. |
| 5,554,426 A * | 9/1996 | Rober et al. ............... 428/36.91 |
| 5,795,939 A | 8/1998 | Lorek |
| 5,959,022 A | 9/1999 | Lin et al. |
| 6,893,729 B2 * | 5/2005 | Inaba et al. ............... 428/474.4 |

FOREIGN PATENT DOCUMENTS

| EP | 216505 A2 | 4/1987 |
| EP | 438239 A2 | 7/1991 |
| EP | 438240 A2 | 7/1991 |
| EP | 570135 A2 | 11/1993 |

* cited by examiner

Primary Examiner — James J Seidleck
Assistant Examiner — Deve E Valdez

(57) ABSTRACT

A coating composition comprising:

at least one polyacrylimide polymer (A)] comprising recurring units of formula (I), and further comprising recurring units complying with one or more of the following structures: J, JJ, JJJ, wherein $R_1$, $R_2$, $R_4$, $R_5$, $R_6$, $R_7$, equal to or different from each other are independently H or $C_{1-20}$ alkyl group, $R_3$ and $R_8$, equal to or different from each other, are independently H, alkyl, cycloalkyl, alkaryl, aryl, heterocyclic $C_{1-36}$ group, wherein said polymer (A) possesses an imidization degree of less than 80%;

a liquid medium; and at least one vinylidene fluoride polymer (F) at least partially dissolved and/or at least partially dispersed in said liquid medium, wherein the amount of polymer (F) ranges from 50 to 90% wt. with respect to the total weight of polymer (A) and polymer (F).

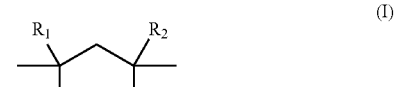

(I)

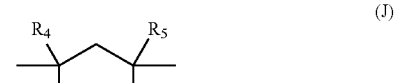

(J)

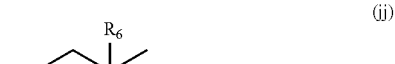

(jj)

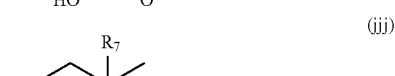

(jjj)

17 Claims, No Drawings

COATING COMPOSITION

CROSS-REFERENCE TO RELATED APPLICATION

This application is a U.S. national stage entry under 35 U.S.C. 371 of International Application No. PCT/EP2010/065424 filed Oct. 14, 2010, which claims priority to U.S. provisional application No. 61/252,009 filed on Oct. 15, 2009, the whole content of these applications being incorporated herein by reference for all purposes.

TECHNICAL FIELD

The invention pertains to novel coating compositions based on vinylidene fluoride polymer and polyimide polymers.

BACKGROUND ART

It is generally understood that, for a polymer blend to be useful as a coating material, outstanding performances with respect to several criteria including optical behaviour (e.g. gloss and weatherability), hardness, abrasion resistance etc. are required.

Vinylidene fluoride (VDF) polymers, possessing unique properties such as exceptional weathering resistance, good abrasion resistance, high mechanical strength and toughness, etc., have been used as base material for coatings, and more particularly for highly weatherable architectural coatings for years. For improving adhesion to substrates, pigment dispersion ability and increasing coating gloss, miscible VDF polymer blends with (meth)acrylic resins have been developed. As optical behaviour of a coating, including e.g. gloss, typically requires coating matrix continuity, thermodynamically miscible blends are preferred, especially for exterior architectural finish applications. Said miscibility also allows the final coating to maximize coating weatherability in long term exterior service.

In view of the above, blends of VDF polymers and (meth) acrylic resin at around a 70:30 weight ratio have been proven to provide optimum material performance with respect to criteria such as adhesion, toughness and optical clarity. However these said blends have reduced hardness and abrasion or mar resistance compared to PVDF alone.

Compositions based on VDF polymers and polyimide polymers comprising glutarimide or methacrylimide moieties have been also disclosed.

EP 0216505 A (ROHM AND HAASCOMPANY) 1 Apr. 1987 discloses polymethacrylimide/thermoplastic blends whereby the degree of imidization is ranging from preferably 50 to 85%. The disclosed blends generally exhibit a better combination of properties including better melt viscosity, greater compatibility and/or miscibility, greater weatherability, greater ductility and better solvent resistance when the degree of imidization is higher. Some examples of polymethacrylimide/Kynar® 720 polyvinylidene fluoride (PVDF) blends are demonstrated whereby the degree of imidization is at least 82%.

U.S. Pat. No. 5,284,913 (MITSUBISHI RAYON CO) 21 Jan. 1992 discloses melt compounded thermoplastic compositions comprising Kynar® 720 polyvinylidene fluoride (PVDF) and a methacrylimide-containing polymer onto which an ethylenic monomer has been grafted. The said compositions retain the excellent heat resistance, weatherability, mechanical properties, and moldability inherently possessed by the methacrylimide-containing polymer, and posses as well the characteristics of the PVDF. The preferred degree of imidization is ranging from 50 to 95%.

Blends of matrix polymers comprising Kynar® 740 polyvinylidene fluoride (PVDF), compatibilized with imide polymers, are described by the EP 0438239 A (ROHM AND HAASCOMPANY) 11 Jan. 1991 application. The preferred degree of imidization is ranging from 40 to 100% and the higher the degree of imidization, the greater the effect on properties such as modulus and heat distortion.

It has been shown in EP 0438240 A (ROHM & HAAS [US]) 16 Jan. 1990 that block copolymers of olefin and imide polymers are useful as compatibilizers in blends with thermoplastic polymers (e.g. PVDF, styrene/acrylonitrile . . . ). No indication has been provided about the degree of imidization.

EP 0570135 A (ROHM & HAAS [US]) 13 May 1992 describes impact modifier polymers having rubbery cores and multiple hard shells in which the said cores are protected from imidization and in which at least one of the hard shells comprises glutarimide, acid, anhydric and acrylate units. The resulting blends are useful in any of various applications in which high heat resistance and impact strength are required. These polymers might be used in combination with PVDF by melt compounding. Some examples are shown whereby the degree of imidization is ranging from 43 to 62%.

The use of polymethacrylimide polymers in a thermoplastic admixture with PVDF as adhesion binder and simultaneously, barrier materials towards fuel has been shown in U.S. Pat. No. 5,795,939 (ATOCHEM ELF SA [FR]) 28 Apr. 1994. No indication has been provided about the degree of imidization.

U.S. Pat. No. 5,510,160 (HUELS CHEMISCHE WERKE AG) 28 Jan. 1994 and U.S. Pat. No. 5,554,426 (HUELS CHEMISCHE WERKE AG) 24 May 1995 describe both the use of polymethacrylimide polymers in an admixture with PVDF as an adhesive bonding layer in a thermoplastic multilayer composite comprising a polyamide layer. These adhesive bonding layers has been claimed to provide improved resistance to chemical agents.

Nevertheless, certain blends fail to provide thermodynamically miscible compositions, so that their optical properties can be dramatically affected. Also, none of the prior art document provides for a suitable solution to the improvement of hardness/abrasion compromise in VDF polymer-coating compositions.

There is thus still a need in the art to develop novel coating compositions based on vinylidene fluoride polymers and polyacrylimide polymers, said composition providing improved hardness and abrasion resistance while maintaining adhesion, optical and other coating properties typical of highly weatherable coatings.

DISCLOSURE OF INVENTION

It is thus an object of the invention a coating composition comprising:
at least one polyacrylimide polymer [polymer (A)] comprising recurring units of formula:

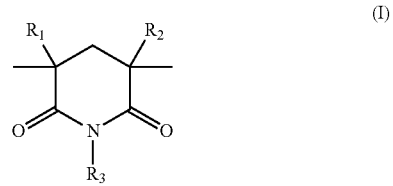

and further comprising recurring units complying with one or more of the following structures:

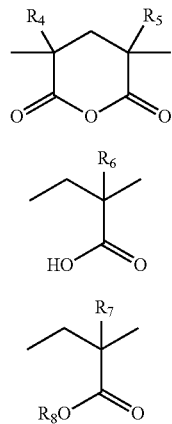

wherein $R_1$, $R_2$, $R_4$, $R_5$, $R_6$, $R_7$, equal to or different from each other are independently H or $C_{1-20}$ alkyl group, $R_3$ and $R_8$, equal to or different from each other, are independently H, alkyl, cycloalkyl, alkaryl, aryl, heterocyclic $C_{1-36}$ group, wherein said polymer (A) possesses an imidization degree of less than 80%;—a liquid medium;
  at least one vinylidene fluoride polymer [polymer (F)] at least partially dissolved and/or at least partially dispersed in said liquid medium, wherein the amount of polymer (F) ranges from 50 to 90% wt. with respect to the total weight of polymer (A) and polymer (F).

The Applicant has found that the coating compositions of the present invention have improved coating hardness and abrasion resistance, while also maintaining required other coating properties, such as adhesion, appearance, gloss and weatherability.

In particular, the selection of the particular imidization degree as above detailed enables efficient improvement of hardness and abrasion, still yielding miscible blends having outstanding optical properties.

The polyacrylimide polymer [polymer (A)] are generally prepared from acrylic polymers using conventional methods, such as those described in U.S. Pat. No. 2,146,209 (DU PONT) 7 Feb. 1939, or in U.S. Pat. No. 4,246,374 (ROHM & HAAS) 20 Jan. 1981. Polymer (A) can thus be produced by reacting a (meth)acrylic polymer with ammonia and/or a primary amine. Depending on the composition of the initial polymer or polymer mixture employed and the imidization conditions used, the final polyimide polymer [polymer (A)] can contain units of any or all of formulas I, j, jj and jjj.

Particularly preferred polyacrylimides are those wherein $R_1$, $R_2$, $R_4$, $R_5$, $R_6$, $R_7$, equal to or different from each other are independently H or $C_{1-20}$ alkyl group, $R_3$ and $R_8$, equal to or different from each other, are independently H and alkyl. Even more particularly preferred, those wherein $R_1$, $R_2$, $R_3$, $R_4$, $R_5$, $R_6$, $R_7$, $R_8$, as mentioned above, equal to or different from each other are H, methyl and ethyl. Most particularly preferred, are the poly(N-methyl methacrylimides) (PMMI) wherein $R_1$, $R_2$, $R_4$, $R_5$, $R_6$, $R_7$ and $R_8$ represent methyl, $R_3$ is H.

Polymer (A) can further comprise recurring units other than those of formulae I, j, jj and jjj as above described. These additional recurring units can derive from any ethylenically unsaturated monomers; non limitative examples thereof are notably styrene monomers (styrene, alpha-methylstyrene), vinyl monomers (vinyl halides, vinyl esters, including vinyl acetate), nitrile monomers (acrylonitrile, methacrylonitrile), olefins (ethylene, propylene, butene), dienes.

Should the polymer (A) comprise one or more additional monomer(s), it can be a random, a graft or a block copolymer of said additional monomer(s) and of units I, j, jj, jjj as above detailed.

Nevertheless, polymer (A) preferably does not contain recurring unit different from units I, j, jj, jjj as above detailed.

The polymer (A) has advantageously a glass transition temperature ($T_g$) of above 60° C. and at most 170° C., preferably in the range of 80° C. to 160° C., more preferably in the range of 100° C. to 160° C.

The glass transition temperature ($T_g$) is measured by Differential Scanning Calorimetry (DSC) at a heating rate of 10° C./min, according to ASTM D 3418.

Within the context of the present invention, the term "degree of imidization" is intended to denote the molar fraction (in percent) of imidized units over those units susceptible of being imidized. In other words, the degree of imidization can be computed as follows:

$$\text{imidization degree (\%)} = \frac{2 \times moles_{unitsI}}{2 \times moles_{unitsI} + 2 \times moles_{unitsj} + moles_{unitsjj} + moles_{unitsjjj}} \times 100$$

Preferably, the degree of imidization is from 10 to 80%, with from 30% to 80% being preferred.

The degree of imidization can be notably determined by elementary analysis.

The Applicant has surprisingly found that when polymer (A) fulfils above mentioned requirements in terms of imidization level it advantageously provides thermodynamically miscible composition with polymer (F), so that the final coatings made from the inventive composition possess outstanding optical properties combined with coating hardness and abrasion resistance.

When polymer (A) possesses an imidization degree of more than 80%, then coating composition as above detailed comprising the same suffer from immiscibility and inhomogeneous dispersion of polymer (A), so that coating properties are impaired. In particular, during coating application, upon heating, separation of polymer (F) due to faster crystallization than polymer (A) produces heterogenous films.

The vinylidene fluoride polymer [polymer (F)] is preferably a polymer comprising:

(a') at least 60% by moles, preferably at least 75% by moles, more preferably 85% by moles of vinylidene fluoride (VDF);

(b') optionally from 0.1 to 15%, preferably from 0.1 to 12%, more preferably from 0.1 to 10% by moles of a fluorinated monomer different from VDF; said fluorinate monomer being preferably selected in the group consisting of vinylfluoride (VF$_1$), chlorotrifluoroethylene (CTFE), hexafluoropropene (HFP), tetrafluoroethylene (TFE), perfluoromethylvinylether (MVE), trifluoroethylene (TrFE) and mixtures therefrom; and (c') optionally from 0.1 to 5%, by moles, preferably 0.1 to 3% by moles, more preferably 0.1 to 1% by moles, based on the total amount of monomers (a') and (b'), of one or more hydrogenated comonomer(s).

The vinylidene fluoride polymer [polymer (F)] is more preferably a polymer consisting of:

(a') at least 60% by moles, preferably at least 75% by moles, more preferably 85% by moles of vinylidene fluoride (VDF);

(b') optionally from 0.1 to 15%, preferably from 0.1 to 12%, more preferably from 0.1 to 10% by moles of a fluorinated monomer different from VDF; said fluorinate monomer being preferably selected in the group consisting of vinylfluoride (VF$_1$), chlorotrifluoroethylene (CTFE), hexafluoropropene (HFP), tetrafluoroethylene (TFE), perfluoromethylvinylether (MVE), trifluoroethylene (TrFE) and mixtures therefrom.

As non limitative examples of the VDF polymers useful in the present invention, mention can be notably made of homopolymer of VDF, VDF/TFE copolymer, VDF/TFE/HFP copolymer, VDF/TFE/CTFE copolymer, VDF/TFE/TrFE copolymer, VDF/CTFE copolymer, VDF/HFP copolymer, VDF/TFE/HFP/CTFE copolymer and the like.

VDF homopolymer is particularly advantageous for the compositions of the invention.

The melt viscosity of the VDF polymer measured at 232° C. and 100 sec$^{-1}$ of shear rate according to ASTM D3835 is advantageously at least 5 kpoise, preferably at least 10 kpoise.

The melt viscosity of the VDF polymer measured at 232° C. and 100 sec$^{-1}$ of shear rate is advantageously at most 60 kpois, preferably at most 40 kpoise, more preferably at most 35 kpoise.

The melt viscosity of VDF polymer is measured in accordance with ASTM test No. D3835, run at 232° C., under a shear rate of 100 sec$^{-1}$.

The VDF polymer has a melting point of advantageously at least 120° C., preferably at least 125° C., more preferably at least 130° C.

The VDF polymer has a melting point advantageously of at most 190° C., preferably at most 185° C., more preferably at most 170° C.

The melting point ($T_{m2}$) can be determined by DSC, at a heating rate of 10° C./min, according to ASTM D 3418.

One example of a commercially available PVDF, which is particularly suitable for use in the present composition, is HYLAR® 5000 PVDF (available from Solvay Solexis Inc.).

For the purpose of the invention, the term "liquid medium" is intended to denote a medium which is available in liquid state at a temperature of 25° C.

According to a first embodiment of the invention, the polymer (F) is at least partially dispersed in said liquid medium.

By the term "dispersed" is meant that the polymer (F) particles are stably dispersed in the liquid medium, so that neither settlement into cake nor solvation of the particles does occur during paint preparation and upon storage.

Polymer (F) according to this embodiment is preferably substantially in dispersed form that is to say that more that 90% wt, preferably more than 95% wt, more preferably than 99% wt is dispersed in the liquid medium.

According to a first variant of this embodiment, the liquid medium comprises water. Said liquid medium can in addition comprise one or more organic solvent(s). Organic solvents which can be used in this embodiment of the invention are preferably organic solvents. Non-limitative examples of such solvents are alcohols such as methanol, ethanol, 1-propanol, 2-propanol, ketones such as acetone, 2-butanone, amides such as dimethyl formamide, dimethyl acetamide, polar solvents such as dimethylsulfoxide, tetrahydrofuran, acetonitrile, dioxane, glycol ethers such as diethylene glycol dimethyl ether, dipropylene glycol dimethyl ether etc.

Within this variant of the first embodiment of the invention, polymer (F) can be provided under dispersed form directly by processes known as emulsion polymerization (i.e. as a latex), optionally followed by concentration and/or further addition of surfactants/dispersing agents. Otherwise, polymer (F) can be firstly dissolved in an organic solvent, wherein said polymer (F) is soluble, and the dispersed form thereof can be obtained by mixing the above obtained solution with water for obtaining polymer (F) particles.

Still, all other techniques known to those skilled in the art can be used. Polymer (F) can be provided in dispersed form in water by means of size-reduction equipment, such as, for example, a high-pressure homogenizer, a colloid mill, a fast pump, a vibratory agitator or an ultrasound device.

For the purpose of the invention, the term "particle" is intended to denote a mass of material that has a definite three-dimensional volume and shape, characterized by three dimensions.

According to a second preferred variant of this embodiment, the liquid medium comprises at least one organic solvent selected from intermediate and latent solvents for the polymer (F).

An intermediate solvent for the polymer (F) is a solvent which does not dissolve or substantially swell the polymer (F) at 25° C., which solvates polymer (F) at its boiling point, and retains polymer (F) in solvated form, i.e. in solution, upon cooling.

A latent solvent for the polymer (F) is a solvent which does not dissolve or substantially swell polymer (F) at 25° C., which solvates polymer (F) at its boiling point, but on cooling, polymer (F) precipitates.

Latent solvents and intermediate solvents can be used alone or in admixture. Mixtures of one or more than one latent solvent with one or more than one intermediate solvent can be used in this second preferred variant.

Intermediate solvents suitable for the coating composition of this second preferred variant are notably butyrolactone, isophorone and carbitol acetate.

Latent solvents suitable for the coating composition of this second preferred variant are notably methyl isobutyl ketone, n-butyl acetate, cyclohexanone, diacetone alcohol, diisobutyl ketone, ethyl acetoacetate, triethyl phosphate, propylene carbonate, triacetin (also known as 1,3-diacetyloxypropan-2-yl acetate), dimethyl phthalate, glycol ethers based on ethylene glycol, diethylene glycol and propylene glycol, and glycol ether acetates based on ethylene glycol, diethylene glycol and propylene glycol.

Non limitative examples of glycol ethers based on ethylene glycol, diethylene glycol and propylene glycol are notably ethylene glycol monomethyl ether, ethylene glycol monoethyl ether, ethylene glycol monopropyl ether, ethylene glycol monobutyl ether, ethylene glycol dimethyl ether, ethylene glycol diethyl ether, ethylene glycol dibutyl ether, diethylene glycol monomethyl ether, diethylene glycol monoethyl ether, diethylene glycol mono-n-butyl ether, propylene glycol methyl ether, propylene glycol dimethyl ether, propylene glycol n-propyl ether.

Non limitative examples of glycol ether acetates based on ethylene glycol, diethylene glycol and propylene glycol are notably ethylene glycol methyl ether acetate, ethylene glycol monethyl ether acetate, ethylene glycol monobutyl ether acetate, propylene glycol methyl ether acetate.

Non-solvents for polymer (F) such as methanol, hexane, toluene, ethanol and xylene may also be used in combination with latent solvent and/or intermediate solvent for special purpose, e.g. for controlling paint rheology, in particular for spray coating.

Generally, the liquid medium of this second embodiment of the invention will consists essentially of one or more organic solvents selected from latent solvents and intermediate solvents, as above detailed.

Minor amounts (e.g. of less than 5% wt, preferably less than 1% wt) of water or other organic solvents might be present in the liquid medium of the composition of this second variant, without this affecting the properties of the coating compositions.

Within this second preferred variant of the first embodiment of the invention, polymer (F) can be provided under dispersed form by dispersing a powder, generally an agglomerated powder obtained from latex coagulation and drying, in a liquid medium comprising latent and/or intermediate solvent as above detailed.

According to this preferred second variant, generally, the polymer (A) is dissolved in above mentioned liquid medium prior to dispersing therein the polymer (F).

The manufacture of the coating composition of this second preferred variant thus preferable comprises:
dissolving polymer (A) in a liquid medium comprising at least one organic solvent selected from intermediate and latent solvents for the polymer (F);
dispersing polymer (F) in said liquid medium containing dissolved polymer (A).

The choice of the device for dispersing the polymer (F) in said liquid medium according to this second variant is not particularly limited, High shear mixers or other size-reduction equipment such as high pressure homogenizer, a colloidal mill, a fast pump, a vibratory agitator or an ultrasound device can be used.

Agglomerated powders of polymer (F) particularly suitable for this second variant are composed of primary particles having an average particle size of preferably 200 to 400 nm and are typically under the form of agglomerates having an average particle size distribution of preferably 1 to 100 μm, more preferably of 5 to 50 μm.

According to a second embodiment of the invention, the polymer (F) is at least partially dissolved in said liquid medium.

By the term "dissolved" is meant that the polymer (F) is present in solubilised form in the liquid medium.

Polymer (F) according to this embodiment is preferably substantially in dissolved form that is to say that more than 90% wt, preferably more than 95% wt, more preferably than 99% wt is dissolved in the liquid medium.

The liquid medium according to this embodiment preferably comprises an organic solvent selected among active solvents for polymer (F).

An active solvent for polymer (F) is a solvent which is able to dissolve at least 5% wt of a polymer (F) (with respect to the total weight of the solution) at a temperature of 25° C.

Active solvents which can be used in this embodiment are notably acetone, tetrahydrofurane, methyl ethyl ketone, dimethylformamide, dimethylacetamide, tetramethylurea, dimethylsulfoxide, trimethylphosphate, N-methyl-2-pyrrolidone.

The liquid medium of this second embodiment can further comprise one or more of intermediate and/or latent solvents for the polymer (F). Nevertheless, the liquid medium will preferably comprise a major amount of the active solvent.

The composition of the invention comprises the polymer (F) in an amount of advantageously at least 50%, preferably at least 60% by total weight of polymer (A) and polymer (F).

The composition of the invention comprises the polymer (F) in an amount of advantageously at most 95%, preferably at most 80% by total weight of polymer (A) and polymer (F).

Good results have been obtained with the coating composition comprising from 50 to 90% of polymer (F) by total weight of polymer (A) and polymer (F). Best results have been achieved with composition comprising from 60 to 80% of polymer (F) by total weight of polymer (A) and polymer (F).

The composition of the invention can additionally comprise at least one (meth)acrylic polymer free from recurring units of formula (I) as above detailed [polymer (M)].

Polymer (M) typically comprises recurring units selected from the group of formulae j, jj, jjj, as above detailed. Preferably, polymer (M) comprises recurring units of formula j, as detailed above. Optionally polymer (M) can comprise additional recurring units different from j, jj, jjj, typically derived from ethylenically unsaturated monomers, such as notably olefins, preferably ethylene, propylene, 1-butene, styrene monomers, such as styrene, alpha-methyl-styrene and the like.

Preferably, polymer (M) is a polymer comprising recurring units derived from one or more than one alkyl (meth)acrylate. A polymer (M) which gave particularly good result within the context of the present invention is a copolymer of methyl methacrylate and ethyl acrylate. This polymer (M) is notably commercially available under trade name PARALOID™ B-44.

Should the composition comprise polymer (M), it is generally comprised in the composition of the invention in a weight ratio polymer (M)/polymer (A) of 10/1 to 1/10, preferably of 5/1 to 1/5, more preferably of 3/1 to 1/3.

The composition of the invention can further comprise one or more pigments. Pigments useful in the composition of the invention notably include, or will comprise, one or more of the following: titanium dioxide which is available form Whittaker, Clark & Daniels, South Plainfield, N.J., USA; Artic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, USA.; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Englehard Industries, Edison, N.J., USA.

Still an object of the invention is a process for manufacturing the coating composition as above detailed.

Another object of the invention is the use of the inventive composition as described above for coating substrates.

Coating technique is not particularly limited. All standard coating techniques suitable for coating compositions comprising a liquid medium can be suitable to this aim. Mention can be notably made of spray coating, curtain coating, casting, coil coating and the like.

Techniques particularly adapted for coating substrates with the composition of the invention are notably coil coating or spray coating.

The choice of substrates is not particularly limited; plastic and metal substrates are illustrative examples.

Still another object of the invention is a coating layer obtained from the coating composition of the invention.

The invention will be now illustrated in more detail by means of the following examples whose purpose is merely illustrative and not limitative of the scope of the invention.

Should the disclosure of any patents, patent applications, and publications which are incorporated herein by reference conflict with the description of the present application to the extent that it may render a term unclear, the present description shall take precedence.

EXAMPLES

In these examples and throughout this specification the abbreviations employed are defined as follows:

HYLAR® 5000 PVDF (available from Solvay Solexis Inc.) is a PVDF homopolymer;

PARALOID™ B-44 commercially available from the Rohm and Haas Company is a copolymer of methyl methacrylate and ethyl acrylate;

PEA is poly(ethyl acrylate);

MEK is methylethylketone;

ACRYMID® PMMI are N-methyl methacrylimides polymers commercially available from Evonik, whose typical properties are summarized in Table 1

TABLE 1

|  | PMMI 813 | PMMI 815 | PMMI 817 |
|---|---|---|---|
| Tg, ° C. (Measured) | 132.1 | 153.2 | 169.5 |
| Melt volume rate (260/10), cm³/10 min. | 20 | 5 | 1 |
| Degree of imidization, % moles (Measured) | 33.5 | 77.6 | 91.6 |

General Procedure for the Preparation of Coating Compositions

Polymer A was initially dissolved in isophorone at room temperature to give a solution containing 20 weight % of the polymer A. HYLAR® 5000 PVDF powder and Shepherd Blue #3 pigment were then added to the solution with further addition of isophorone. The mixture was added with glass beads and shaken vigorously for 2 hours to give the final blue PVDF paint.

General Procedure for the Application of the Coating Composition onto a Substrate by Coil Coating The coating composition was applied onto a chromate treated aluminum panel by an application bar and then baked in the oven at 270° C. for 45 to 50 second to give a peak metal temperature between 240 to 249° C. The coated panel was then quenched in a water bath.

General Procedure for the Application of the Coating Composition onto a Substrate as Spray Coating The coating composition was applied onto a chromate treated aluminum panel by a spray application bar and then baked at 240° C. for 20 minutes. The coated panel was cooled in the air.

Characterization of Coating Layers of Coated Substrates

Coated substrates obtained either by spray coating or by coil coating conditions were characterized according to following techniques.

Determination of Pencil Hardness

The coated panel was subjected to a pencil hardness test according to ASTM D 3363 to evaluate the coating hardness.

Determination of T-Bend

The coated panel was subjected to a T-Bend test in accordance to ASTM D 4145 to evaluate the flexibility and the adhesion Determination of Abrasion Resistance The coated panel was subjected to a Taber Abrasion test according to the ASTM D 4060 to evaluate the abrasion resistance. The 4-in. (100 mm) by 4 in. (100 mm) coated panel was abraded against a CS-10 wheel loaded with a 750 grams load. Weight losses of the coating were measured by a microbalance after 1000 and 2000 cycles. The average weight loss per 1000 cycles was calculated.

Determination of Gloss

The optical behaviour such as gloss was evaluated by determining the 60° gloss values of the coated panel which was measured according to the ASTM D 523-89 test.

Determination of Solvent Resistance

The solvent resistance of the coated panel was assessed by using a solvent rub technique in accordance with the ASTM D 5402 test. MEK was used as solvent. The MEK resistance is defined as the number of double rubs to remove a 1 mil thick of the coating using a machine having a flat rubbing probe with 5 inches in diameter under a loading of 80 psi.

Examples 1 and 2

Ingredients of coating compositions comprising PMMI 813 and PMMI 815 resins are described in Table 2.

Evaluation tests were carried out on specimens of coated substrates obtained by procedures described above. Data are summarized in Table 3.

Comparative Example 3

Ingredients of coating compositions comprising PMMI 817 having an imidization degree of 91.6% moles are described in Table 2.

Evaluation tests were carried out on specimens of coated substrates obtained by procedures described above. Data are summarized in Table 3.

Comparative Examples 4 and 5

Same procedures as described in examples 1 and 2 were repeated but using the acrylic resins PEA and PARALOID™ B-44 instead of PMMI resins. Relevant data are summarized in Tables 2 and 3.

Examples 6, 7, 9 and 10

Same procedures as described in examples 1 and 2 were repeated but using mixtures of PMMI resins (PMMI 813 and PMMI 815) and acrylic resin PARALOID™ B-44. Data are summarized in Tables 2 and 3.

Comparative Examples 8 and 11

Same procedures as described in examples 1 and 2 were repeated but using mixtures of PMMI 817 resin and acrylic resin PARALOID™ B-44. Data are summarized in Tables 2 and 3.

TABLE 2

| | Coating compositions | | | | | |
|---|---|---|---|---|---|---|
| Example | PVDF | PMMI 813 | PMMI 813 | PMMI 817 | PEA | PARALOID™ B-44 |
| | | | weight parts | | | |
| 1 | 100 | 42.86 | | | | |
| 2 | 100 | | 42.86 | | | |
| 3 (Comp) | 100 | | | 42.86 | | |
| 4 (Comp) | 100 | | | | 42.86 | |
| 5 (Comp) | 100 | | | | | 42.86 |
| 6 | 100 | 21.23 | | | | 21.23 |
| 7 | 100 | | 21.23 | | | 21.23 |
| 8 (Comp) | 100 | | | 21.23 | | 21.23 |
| 9 | 100 | 10.71 | | | | 32.15 |
| 10 | 100 | | 10.71 | | | 32.15 |
| 11 (Comp) | 100 | | | 10.71 | | 32.15 |

TABLE 3

| Example | Pencil hardness C | Pencil hardness S | Gloss 60° C | Gloss 60° S | Taber abrasion C | Taber abrasion S | MEK, 102 double rubs/mil C | MEK, 102 double rubs/mil S | T-Bend C | T-Bend S |
|---|---|---|---|---|---|---|---|---|---|---|
| 1 | 4H | 4H | 8.8 | 17.8 | 10.8 | | 360 | 514 | 0T | 0T |
| 2 | 5H | 4H | 9.7 | 10.9 | 14.3 | | 41.3 | 33.4 | 1T | 1T |
| 3 (Comp) | H | 2H | 1.6 | 1.2 | 17.0 | | 65.1 | 63.7 | 3T | 3T |
| 4 (Comp) | 2B | HB | 29.5 | 45.2 | 29.4 | | 0.15 | 0.66 | 1T | 2T |
| 5 (Comp) | 2H | 2H | 23.3 | 28.1 | 11.7 | | 35.7 | 44.6 | 0T | 0T |
| 6 | 2H | 3H | | | 13.9 | | | | 0T | 1T |
| 7 | 4H | 3H | | | 12.4 | | | | 0T | 0T |
| 8 (Comp) | 3H | 4H | | | 15.6 | | | | 1T | 0T |
| 9 | 3H | 3H | | | 13.4 | | | | 0T | 0T |
| 10 | 3H | 2H | | | 16.1 | | | | 2T | 2T |
| 11 (Comp) | 3H | 3H | | | 15.8 | | | | 0T | 0T |

C means coil coating;
S means spray coating.

The examples here above demonstrate that compositions of the invention provide improved hardness and abrasion resistance while still maintaining outstanding optical properties.

The invention claimed is:

1. A coating composition comprising:
   at least one polyacrylimide polymer (A) comprising recurring units of formula:

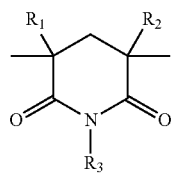

(I)

and further comprising recurring units complying with one or more of the following structures:

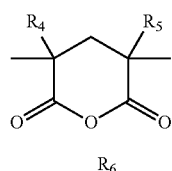

(j)

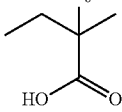

(jj)

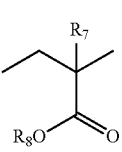

(jjj)

wherein $R_1$, $R_2$, $R_4$, $R_5$, $R_6$, $R_7$, equal to or different from each other are independently H or a $C_{1-20}$ alkyl group, $R_3$ and $R_8$, equal to or different from each other, are independently H, alkyl, cycloalkyl, alkaryl, aryl, or a heterocyclic $C_{1-36}$ group, wherein said polymer (A) possesses an imidization degree of less than 80%;

a liquid medium; and
at least one vinylidene fluoride polymer (F) at least partially dissolved and/or at least partially dispersed in said liquid medium, wherein the amount of polymer (F) ranges from 50 to 90% wt. with respect to the total weight of polymer (A) and polymer (F).

2. The coating composition of claim 1, wherein polymer (F) comprises:
   (a') at least 60% by moles of vinylidene fluoride (VDF);
   (b') 0.1 to 15% by moles of a fluorinated monomer different from said VDF; said fluorinated monomer being selected from the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom; and
   (c') 0.1 to 5% by moles, based on the total amount of monomers (a') and (b'), of one or more hydrogenated comonomer(s).

3. The coating composition of claim 2, wherein more than 90% wt of polymer (F) is dispersed in the liquid medium.

4. The coating composition of claim 3, wherein the liquid medium comprises at least one organic solvent selected from intermediate and latent solvents for polymer (F).

5. The coating composition of claim 4, wherein said intermediate solvent is selected from the group consisting of butyrolactone, isophorone and carbitol acetate and said latent solvent is selected from the group consisting of methyl isobutyl ketone, n-butyl acetate, cyclohexanone, diacetone alcohol, diisobutyl ketone, ethyl acetoacetate, triethyl phosphate, propylene carbonate, triacetin (also known as 1,3-diacetyloxypropan-2-yl acetate), dimethyl phthalate, glycol ethers based on ethylene glycol, diethylene glycol and propylene glycol, and glycol ether acetates based on ethylene glycol, diethylene glycol and propylene glycol.

6. The composition according to claim 1, wherein polymer (F) is present in an amount of at least 50% by total weight of polymer (A) and polymer (F).

7. The composition according to claim 1, wherein polymer (F) is present in an amount of at most 95% by total weight of polymer (A) and polymer (F).

8. The composition according to claim 1, further comprising at least one (meth)acrylic polymer (M), free from recurring units of said formula (I).

9. The composition according to claim 8, wherein said polymer (M) is a polymer comprising recurring units derived from one or more than one alkyl (meth)acrylate.

10. The process for manufacturing the coating composition according to claim 1.

11. The process for manufacturing the composition of claim 4, said process comprising:
    dissolving said polymer (A) in said liquid medium comprising at least one organic solvent selected from intermediate and latent solvents for the polymer (F); and
    dispersing said polymer (F) in said liquid medium containing dissolved said polymer (A).

12. The method for coating substrates comprising the use of the coating composition according to claim 1.

13. The coating layer obtained from the coating composition of claim 1.

14. The composition according to claim 1, wherein polymer (A) has a glass transition temperature (Tg) in the range of 100° C. to 160° C. as measured by Differential Scanning Calorimetry at a heating rate of 10° C./min, according to ASTM D 3418.

15. The composition according to claim 1, wherein polymer (F) has a melt viscosity of at least 10 kpoise and at most 35 kpoise as measured in accordance with ASTM D3835, run at 232° C., under a shear rate of 100 sec$^{-1}$.

16. The composition according to claim 1, wherein polymer (F) has a melting point of at least 130° C. and at most 170° C. as measured by Differential Scanning calorimetry at a heating rate of 10° C./min, according to ASTM D 3418.

17. The composition according to claim 1, wherein primary particles of dispersed polymer (F) have an average particle size of 200 to 400 nm.

* * * * *